(12) United States Patent
Aunio et al.

(10) Patent No.: US 6,456,210 B2
(45) Date of Patent: Sep. 24, 2002

(54) DATA TRANSMISSION METHOD AND ARRANGEMENT

(75) Inventors: Antti Aunio, Oulu (FI); Esko Erkkilä, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/784,250

(22) Filed: Feb. 15, 2001

(30) Foreign Application Priority Data

Feb. 18, 2000  (FI) .............................................. 20000379

(51) Int. Cl.⁷ ................................................ H03M 1/00
(52) U.S. Cl. ....................................... 341/110; 375/345
(58) Field of Search ................................ 341/110, 155, 341/156, 118–120, 135, 112–116, 126

(56) References Cited

U.S. PATENT DOCUMENTS

| | | | | |
|---|---|---|---|---|
| 5,113,129 A | * | 5/1992 | Hughes ....................... | 326/316 |
| 5,175,722 A | * | 12/1992 | Minami et al. ............. | 369/116 |
| 5,548,573 A | * | 8/1996 | Takeuchi ..................... | 369/116 |
| 5,815,107 A | * | 9/1998 | Frankeny et al. ............ | 341/159 |
| 6,128,354 A | * | 10/2000 | Rybicki et al. ............. | 375/345 |
| 6,164,125 A | * | 12/2000 | Kawase et al. ............. | 73/118.1 |

OTHER PUBLICATIONS

English Abstract of Japanese Patent document No. JP63314928.

* cited by examiner

*Primary Examiner*—Brian Young
*Assistant Examiner*—John B. Nguyen
(74) *Attorney, Agent, or Firm*—Perman & Green, LLP

(57) ABSTRACT

The invention relates to a data transmission method and a data transmission arrangement implementing the method. The data to be transferred is digital and consists of bits, the value of which is determined using voltage. In the solution, an electric current corresponding with the digital value of the data to be transmitted is formed in a current converter (3004, 3024) which is transferred on the bus (310, 312). The original digital data is restored from the electric current after data transmission using a reverse current converter (3006, 3022).

10 Claims, 7 Drawing Sheets ately, the bit or bits and the value of the digital data bit is determined using bit voltage.

DATA TRANSMISSION METHOD AND ARRANGEMENT

FIELD OF THE INVENTION

The invention relates to a data transmission method for digital data transmission between two electric circuits in particular.

BACKGROUND OF THE INVENTION

In order to send a signal by means of a radio system transmitter, a baseband digital signal is generally converted into analogue mode using an ASIC circuit (Application Specific Integrated Circuit), whereafter the signal is converted into radio frequency mode and sent through an antenna. Correspondingly, when the radio frequency signal has been received by the antenna and converted into baseband mode, the baseband signal is generally converted into digital mode using an ASIC circuit. Consequently, the interface between the digital ASIC circuit and the analogue ASIC circuit of the transmitter and receiver of the radio system requires a larger data transmission capacity, particularly in third generation products. For example, in the WCDMA radio system (Wideband Code Division Multiple Access) data transmission employs modulation where the data to be transferred is divided into I and Q branches (in-phase and Quadrature). In such a case, both the receiver and the transmitter include separate I and Q data buses between the analogue and digital ASIC circuit. In the receiver an A/D converter of the ASIC circuit requires a six-bit bus, whose clock frequency is generally 19.2 MHz. In order to increase capacity both the I and Q branches can be connected to the same bus, but in such a case the clock frequency must be increased. In the transmitter, in turn, a D/A converter of the ASIC circuit uses ten bits. In this case too, the I and Q branch can be connected using a doubled data transmission rate (2.19.2 MHz). Thus, a 10-bit wide data bus is formed that operates at a 38.4 MHz clock frequency. The problem arising when increasing the clock frequency is, however, that the frequency band widens, and consequently the interferences become stronger. Increasing the clock frequency also adds the power consumption of the bus.

BRIEF DESCRIPTION OF THE INVENTION

It is an object of the method and the apparatus implementing the method to improve data transmission. The method according to claim 1 is thus presented as the invention.

The invention also relates to a data transmission arrangement according to claim 7.

The preferred embodiments of the invention are disclosed in the dependent claims.

The idea of the invention is that digital data, in which bit values are based on different voltage levels, are converted into electric current. After data transmission the electric current is reconverted into the original digital data.

Several advantages are achieved with the method and arrangement of the invention. Data transmission in current form reduces interference, the number of required buses and the need to increase clock frequency. For these reasons the power consumption can also be reduced.

BRIEF DESCRIPTION OF THE DRAWINGS

In the following the invention will be described in greater detail by means of the preferred embodiments with reference to the accompanying drawings, in which.

DETAILED DESCRIPTION OF THE INVENTION

The presented solution is applicable particularly to a transceiver of a radio system, however, without being restricted thereto.

Let us first define digital data. Digital data is formed of a bit or bits and the value of the digital data bit is determined using bit voltage.

Figure 1:
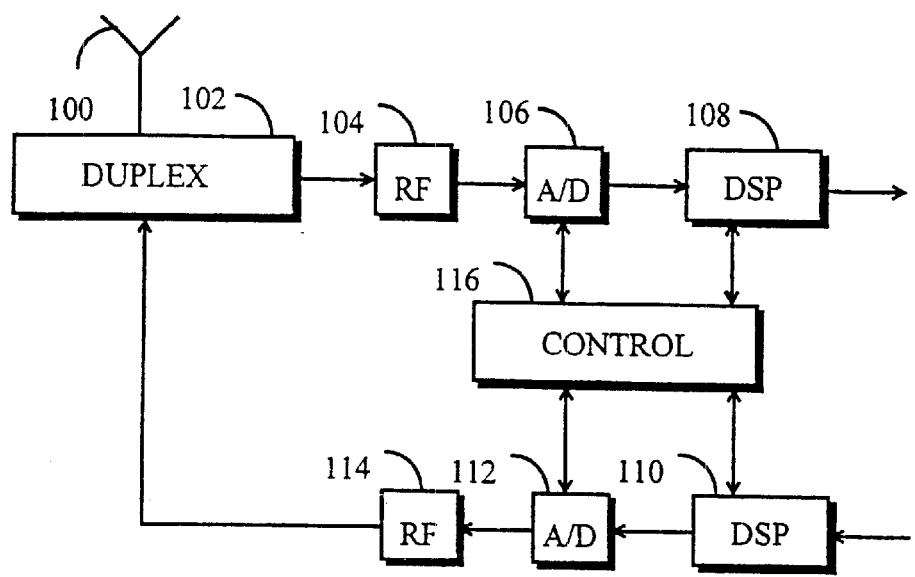
FIG. 1 shows a transceiver.

FIG. 1 allows us to take a closer look at the transceiver. When signal is received, a signal propagates from an antenna 100 to a duplex filter 102, which distinguishes the functions of a transmitter and a receiver from one another. The signal propagates from the duplex filter 102 to an RF block 104, in which a radio frequency signal is converted into a baseband. The baseband analogue signal is converted into digital mode in an A/D converter 106, whereafter the digital signal propagates to a digital signal processing block 108, which is unessential for the invention. In the digital data mode the bit values are coded to correspond with different voltage strengths in such a manner that bit value 0 corresponds with a certain voltage value and bit value 1 corresponds with another voltage value. When signal is sent, a signal propagates to a digital signal processing block 110. The processed signal is converted into analogue mode in a D/A converter 112 and the baseband analogue signal is further converted into a radio frequency signal in an RF block 114. The radio frequency signal propagates through the duplex filter 102 to the antenna 100, from where the signal is transmitted further as electromagnetic radiation. A control block 116 controls the operation of the transceiver. The blocks 106, 108, 110 and 112 of the transceiver are generally implemented using two ASIC circuits, the blocks 106 and 112 being on the analogue ASIC circuit and the blocks 108 and 110 on the digital ASIC circuit. Hence, when signal is sent and received the data in the signal is transferred between the analogue and digital ASIC circuit.

Figure 2A:
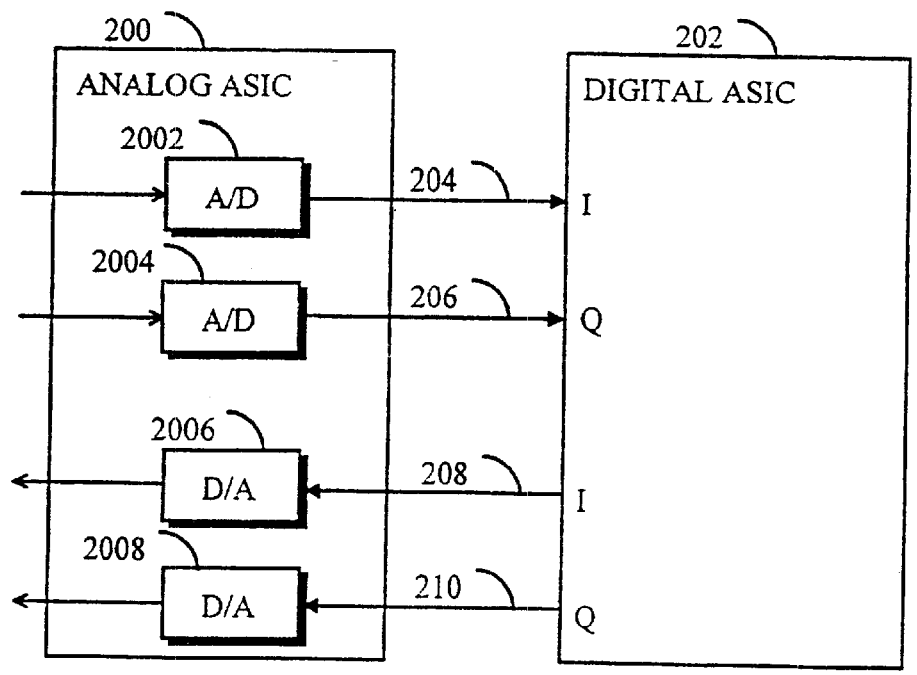
FIG. 2A shows data transmission between an analogue and a digital ASIC circuit.
Figure 2B:
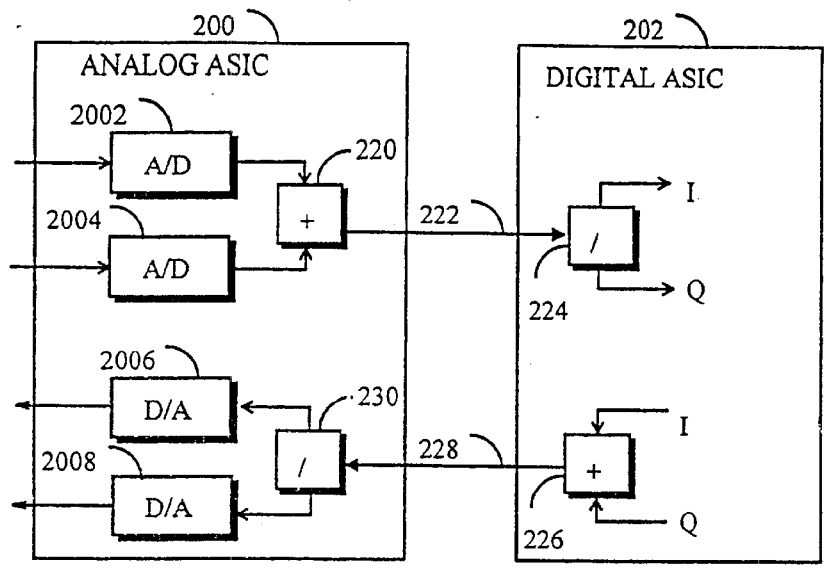
FIG. 2B shows data transmission between an analogue and a digital ASIC circuit.

In the following, FIGS. 2A and 2B illustrate prior art solutions. An analogue ASIC circuit 200 and a digital ASIC circuit 202 are located, for example, in the transceiver of the radio system. During reception, the ASIC circuits operate as follows. The analogue ASIC circuit 200 comprises an A/D converter 2002 for converting the analogue data of the I branch into digital mode. An A/D converter 2004, in turn, converts the analogue data of the Q branch into digital mode.

The digital data of the I branch is transferred to the digital ASIC circuit 202 on its specific bus 204. Likewise, the digital data of the Q branch is transferred on its specific bus 206 to the digital ASIC circuit 202. During transmission, the ASIC circuits operate as follows. As the data of the I branch propagates along a bus 208 from the digital ASIC circuit 202 to the analogue ASIC circuit 200, a D/A converter 2006 converts the digital data into analogue mode. Likewise, as the data of the Q branch propagates along a bus 210, a DIA converter 2008 converts the digital data into analogue mode.

In the case shown in FIG. 2B the analogue A/D converter 2002 and A/D converter 2004 of the ASIC circuit 200 convert the data of the I and Q branches in the same way as in the case shown in FIG. 2A. Before data is transmitted to the ASIC circuit 202 the binary data of the I and Q branches is multiplexed to the same bus 222 using a combiner 220. A multiplexer, for example the combiner 220, multiplexes the bits of the I and Q branches in such a manner that every other bit is an I branch bit and every other bit is a Q branch bit. The data transmission rate of the bus 222 is kept at the same level as the combined data transmission rate of the buses 204 and 206 in FIG. 2A by doubling the clock frequency. The digital ASIC circuit 202 comprises a divider 224 that separates the data obtained from the bus 222 back to the I and Q branches. The multiplexer, for example the divider 224, separates the bits on the bus 222 in opposition to a combination, for example, in such a manner that every other bit is transferred to the I branch and every other bit to the Q branch. Correspondingly a combiner 226 of the digital ASIC circuit 202, which may be identical with the combiner 220, multiplexes the binary data of the I and Q branches to a mutual bus 228 in which data is transferred using a double data transmission rate in comparison to the bus 208 or 210 in FIG. 2A. The analogue ASIC circuit 200 comprises a divider 230 that separates the binary data on the bus 228 to the I and Q branches in a manner opposed to the combination. The data of the I and Q branches is converted into analogue mode in a D/A converter 2006 and 2008.

Figure 3A:
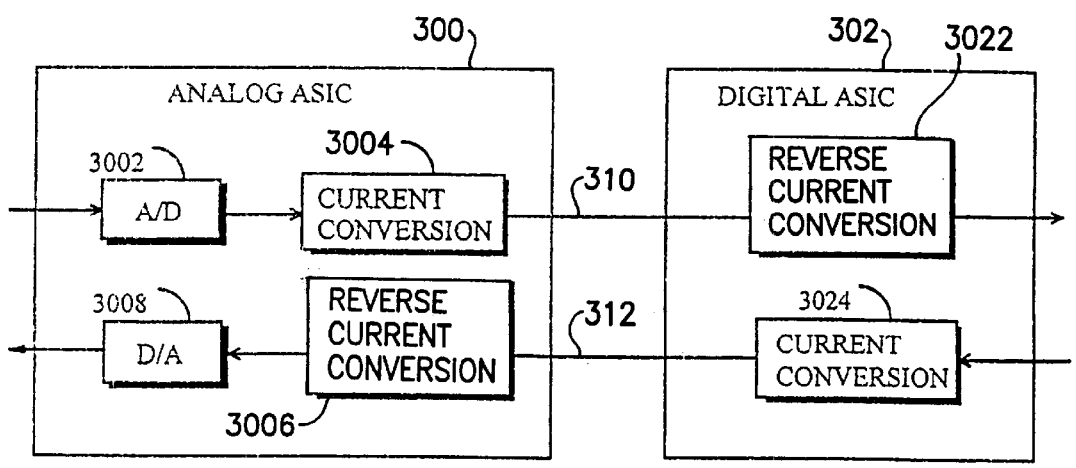
FIG. 3A shows data transmission as electric current.

FIG. 3A shows data transmission in general between an analogue ASIC circuit 300 and a digital ASIC circuit 302 utilizing a conversion, in which a corresponding electric current strength is formed of the digital value of the data. FIG. 3A corresponds with the case shown in FIG. 2A. In the analogue ASIC circuit 300 the analogue data is converted into digital mode using an A/D converter 3002. The electric current strength corresponding with the digital value of the data is formed in a current converter 3004. The electric current is transferred on a bus 310 to the digital ASIC circuit 302 where a reverse current converter 3022 reconverts the electric current strength into digital data. When data is transferred from the digital ASIC circuit 302 to the analogue ASIC circuit 300 an electric current strength corresponding with the digital value of the data to be transferred using a current converter 3024 and the electric current is fed onto the bus 312. The electric current strength obtained from the bus 312 is restored into digital data using a reverse current converter 3006. The digital data is further converted into analogue mode in a D/A converter 3008. The buses 310 and 312 are formed of a conductor which conducts electricity and in which electric current may flow.

Figure 3B:
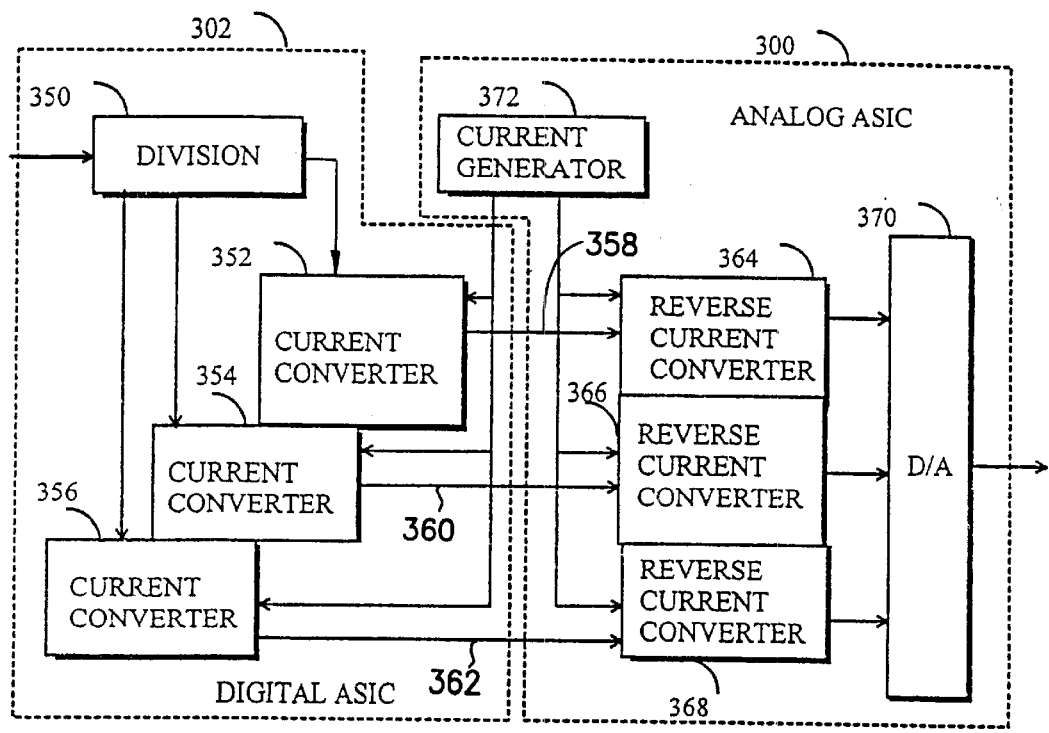
FIG. 3B shows the division of digital words into part-words and the data transmission of the part-words as electric current.

FIG. 3B shows a solution in which a 10-bit digital word of the ASIC circuit is divided into three parts before data transmission. In a division block 350 the first 4 bits forming the first part-word are transferred to a current converter 352, the 4 bits in the middle forming the second part-word are transferred to a current converter 354 and the last 2 bits forming the third part-word are transferred to a current converter 356. However, the length of the digital words to be divided, the number of part-words or the length of the part-words in the division block 350 are not essential for the invention. Each current converter 352, 354 and 356 form an electric current, the strength of which corresponds with the value of the binary word formed by the bits. The electric current is transferred from each current converter on a specific bus 358, 360, 362 to reverse current converters 364, 366 and 368 of the analogue ASIC circuit 300 for restoring the data as a digital data part-word to be based on voltage strengths instead of an electric current strength. The digital part-words are combined and the whole digital word is converted into analogue mode in a D/A converter 370. A current generator 372 operates as the electric current source in current conversions. Test measurements may, if needed, be used to adjust the function of the current generator 372 in such a manner that the contents and the value of digital data in conversions remain unchanged.

Figure 4A:
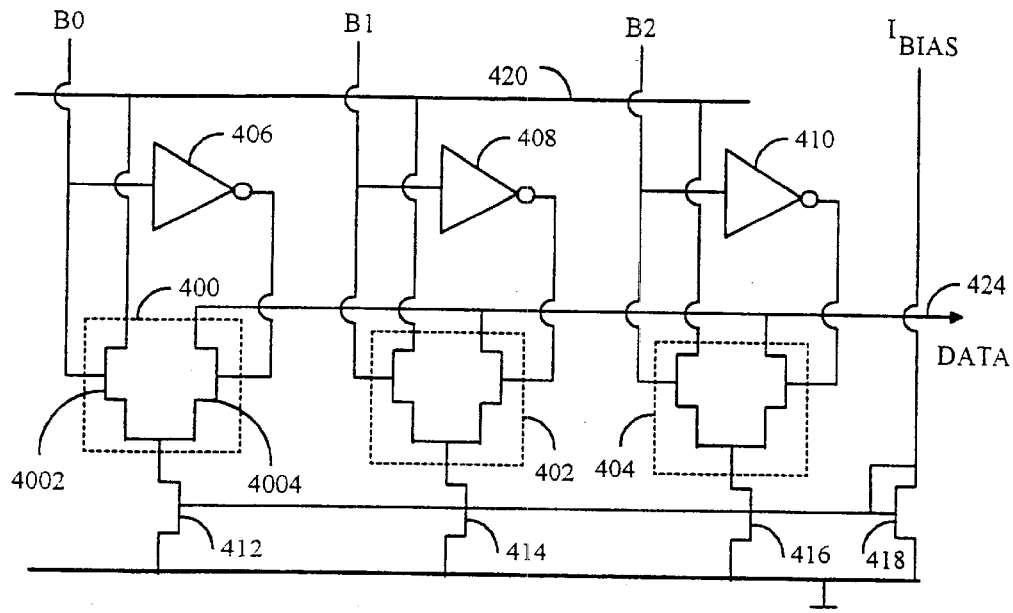
FIG. 4A shows a converter that converts a 3-bit digital word into electric current.

FIG. 4A shows one solution to convert the digital data voltage levels into various electric current strengths. In this example, a 3-bit converter is used, as on the basis of the example it is obvious for those skilled in the art how a corresponding converter operates when different numbers of bits are used. In this example, the function of the current converter is based on a current mirror principle. The converter comprises switches 400–404, inverters 406–410, transistor units 412–416 functioning as current mirrors and a transistor 418 connected as a diode, a bias current flowing through the transistor which enables the current mirror operation. The operating voltage arrives from a line 420 and the current mirror units 412–416, which are preferably based on the MOSFET structure, are earthed 422. The converter operates as follows. The conversion stage of each bit feeds electric current onto the bus according to the value of the bit. The operation may vary, but one way to operate is for example the following. When the value of a bit is one, electric current is fed from the conversion stage of the bit onto the bus, and when the bit is zero, the conversion stage of the bit does not feed electric current onto the bus.

Let us now take a closer look at how the converter operates. When the value of bit B0 is such that the voltage corresponding with the value of B0 is positive, a transistor 4002 of the switch 400 starts to conduct electricity, whereas the conduction of electricity through a transistor 4004 of the switch 400 is prevented, since no voltage is supplied to the port of the transistor 4004 through the inverter 406. No current is supplied to the bus 424 in such a case. Correspondingly, if the voltage corresponding with B0 is zero (earth level), the transistor 4002 of the switch 400 does not conduct electricity, but the transistor 4004 conducts electricity and provides an electric current on the bus 424. The conversion stages of bits B1 and B2 operate in the same way. The electric current strengths provided by the conversion stages of each bit must be separable from one another in order that the binary data can be restored. Different electric current strengths through the transistor units 412–416 are provided by forming transistor units of various numbers of individual transistors (or by changing the breadth of the transistor), in which case a drain current of each transistor unit corresponding with the bias current to be mirrored increases in relation to the number of transistors in the transistor unit. The values of the bits can be coded as electric current strengths using various obvious ways known to those skilled in the art, for example, using binary-weighted coding or temperature coding. One way of coding, represented by the solution in FIG. 4, is binary-weighted. In this case the electric current strength of the conversion stage of each bit to be fed onto the bus 424 is proportional to the bit value in the digital word. Then, if the electric current strength corresponding with bit B0 is I corresponding with the bias current, the electric current strength corresponding with bit B1 is 2I and the current strength corresponding with bit B2 is 4I. Generally the current strengths in the conversion stage of each bit is 2i, where i is the consecutive number of the conversion stage or the index between 0 . . . N so that N+1 is the number of conversion stages.

Figure 4B:
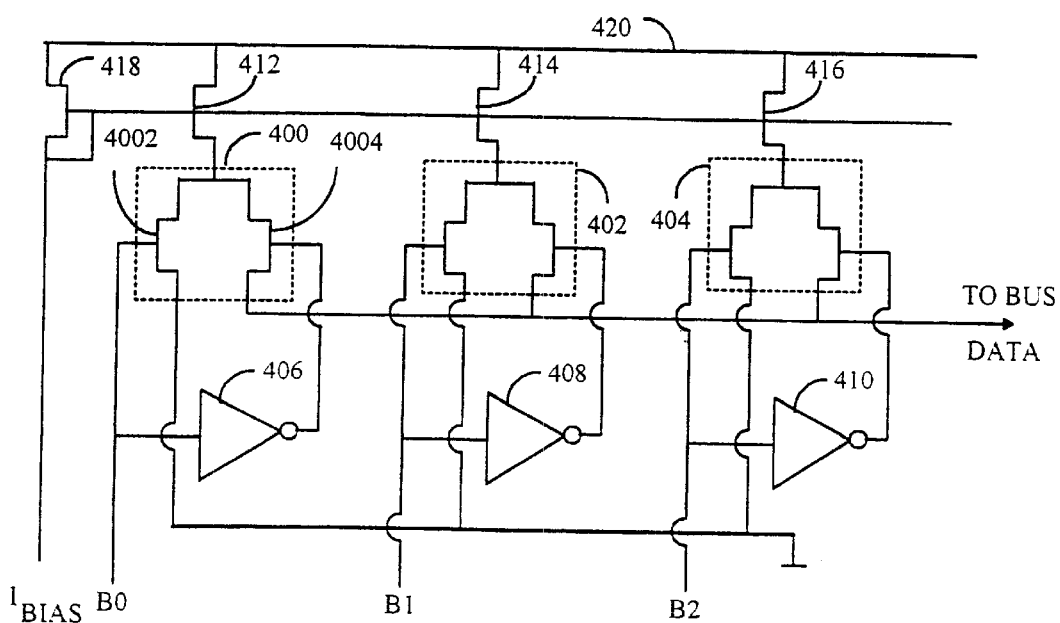
FIG. 4B shows a simple variation of the converter in FIG. 4A.

The function of the current converter according to FIG. 4B is similar to the function of the current converter in FIG. 4A, but reversed. In this solution the switches 400–404 and the transistor units 412–416 have changed order. To feed electric current onto the bus 424 is now reversed in comparison with the case in FIG. 4A. If bit B0 to B2 in the case shown in FIG. 4A is such that the bit provides the supply of electric current to the bus 424, then electric current is not fed onto the bus in the case shown in FIG. 4B. If, in turn, bit B0 to B2 in FIG. 4A causes such a situation in which no current is supplied to the bus 424 (earthed), then electric current is fed onto the bus 424 in the case shown in FIG. 4B.

Figure 5A:
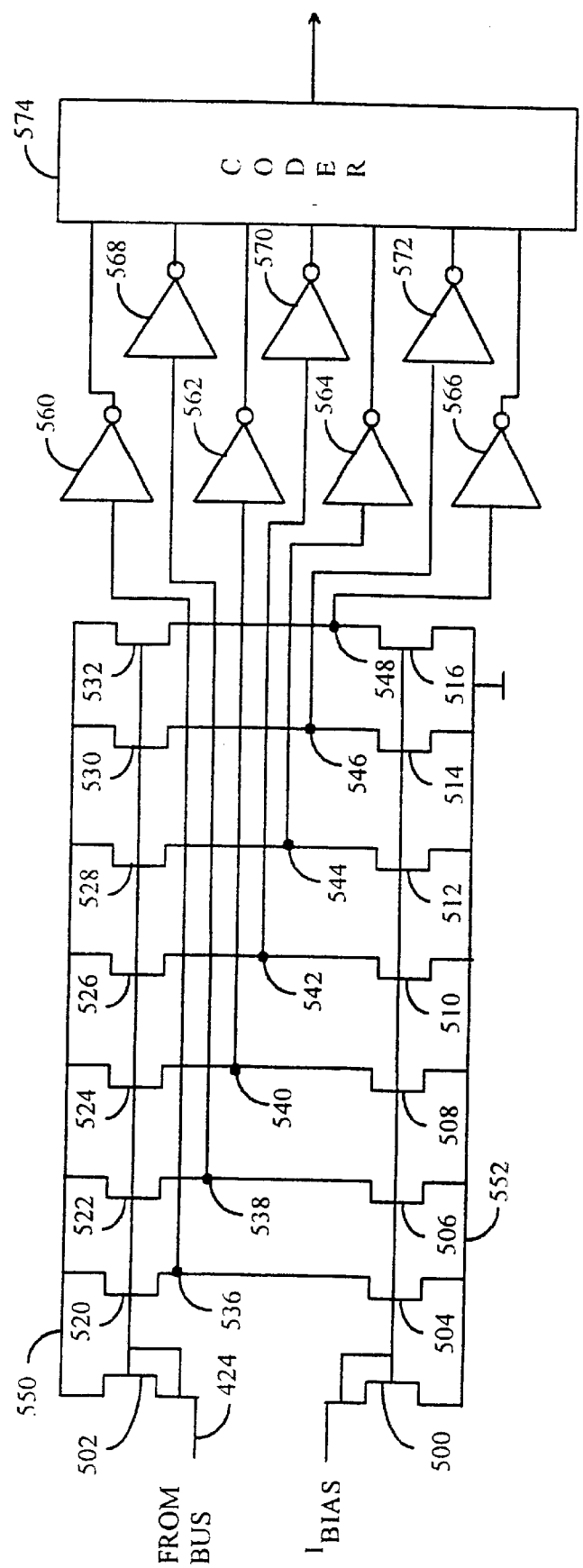
FIG. 5A shows a converter that converts the electric current into digital mode.

The reverse current conversion can be performed, for example, using an arrangement as described in FIG. 5A. The basic idea in rechanging the current strength to a digital value based on voltage magnitudes is to compare the current strength supplied from the bus 424 to a bias current which is preferably the same bias current as the one shown in FIG. 4. The function of the reverse conversion is also based on current mirroring. The bias current is preferably obtained, as shown in FIG. 3B, from a mutual current generator 372. The bias current is supplied to a transistor 500 connected as a diode and the current fed onto the bus 424 is supplied to a transistor 502 connected as a diode. The transistor units 504–516 on the bottom line, preferably based on the PMOS structure (P-channel Metal Oxide Semiconductor Field Effect Transistor), comprise a different number of individual transistors (the breadth of the transistor may be changed). The transistor unit 504 therefore lets through the same amount of electric current, which, is here indicated by $l_o$, as the transistor 500 connected as a diode corresponding with the bias current. A second transistor unit 506 on the bottom line, in turn, admits, for example, a double amount of current compared with the previous transistor unit 504, i.e. $2·I_0$. For example, a threefold amount of electric current, i.e. $3·I_0$, may flow through a following transistor unit 508. The same principle holds true for the other transistor units of the bottom line so that a sevenfold amount of electric current, i.e. $7·I_0$, may flow through the last transistor unit 516. In general an electric current, which is $(2^{N+1}-1)$ times larger than the electric current flowing through the first transistor unit where N+1 is the number of bits B0-BN, may flow through the last transistor unit. The transistor units 520 to 532 on the top line, preferably based on the NMOS structure, are all similar and an electric current corresponding with the bias current flows therethrough.

The function of the reverse converter is based on the fact that a different electric current strength flows through the various transistor units in the bottom line transistor units 504 to 516, whereas only the same electric current strength depending on the electric current strength transferring data and being supplied by the bus 424 may flow through the different transistor units in the top line transistor units 520 to 532. The voltage of connection points 536 to 548 between the bottom line and top line transistor units depends on whether the connection points 536 to 548 are connected to the operating voltage 550 or to the ground 552 through the transistor units 504 to 516 and 520 to 532. The transistor units 504 to 516 to be controlled by the bottom line bias current are always in a conductive state so as to continuously admit electric current proportional to bias current therethrough. If no electric current is supplied by the bus 424, none of the top line transistor units 520 to 532 admits a significant amount of electric current therethrough and the voltage in the connection points 536 to 548 decreases since the resistance over the transistor units 504 to 516 changes. When the bus 424 supplies such an amount of electric current that corresponds with bit B0, the voltage of the connection point 520 increases, whereas the voltages of the other connection points 522 to 532 remain on the ground. As the electric current strength increases in relation to the converted digital words, more and more of the top line transistor units 520 to 532 increase the voltage of the connection points 536 to 548 connected to a specific transistor unit in such a manner that the converted digital word is such (for example 000 or 111) that the bus 424 supplies the highest possible electric current strength, and the voltage of all connection points 536 to 548 is high. Each connection point 536 to 548 is connected to an inverter 560 to 572 that reverse the voltage value. From the inverters 560 to 572 the voltages are fed, for example, to a coder 574 that reconverts the voltage values to the binary mode.

Figure 5B:
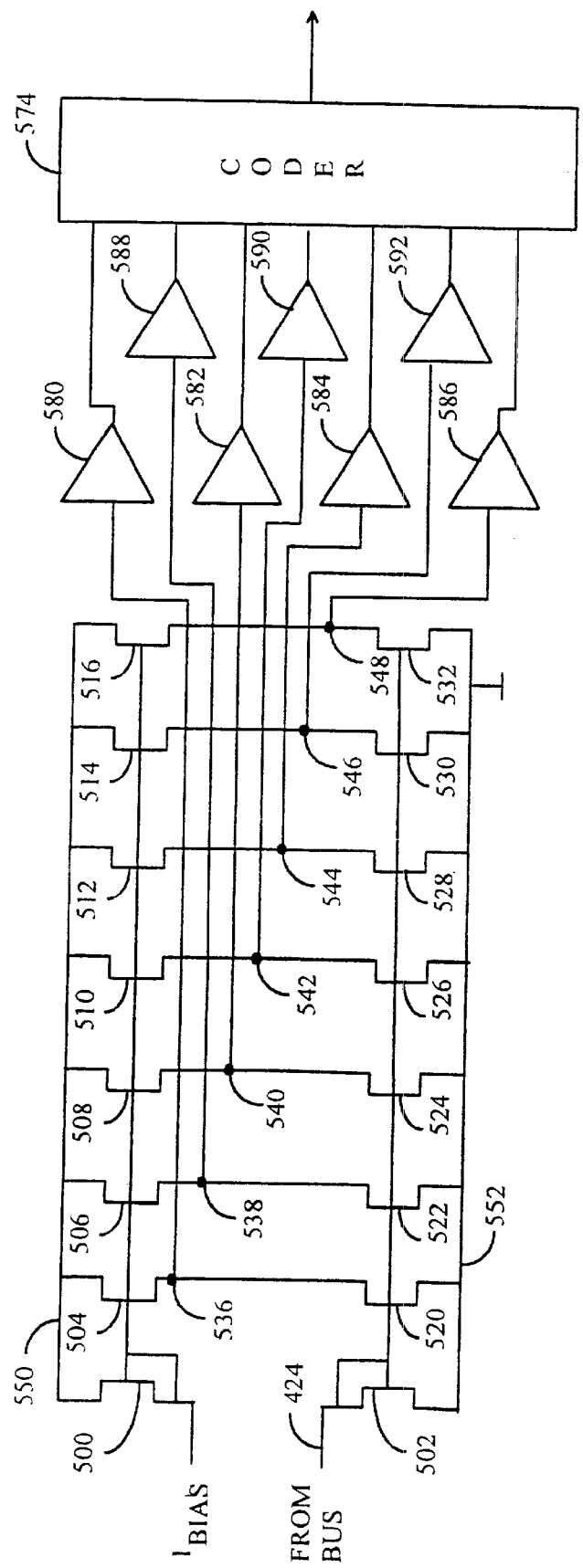
FIG. 5B shows a simple variation of the converter in FIG. 5A (suitable to be used together with the converter shown in FIG. 4B)

The function of the current converter in FIG. 5B is very similar to the function of the current converter in FIG. 5A. These two differ, for example, in that the bottom line and top line transistor units have changed positions and in that the inverters 560 to 572 have been replaced with direct amplifiers 580 to 592, in which case the voltages of the connection points 536 to 548 are directly amplified. The reverse current converter in FIG. 5B is suitable to be used together with the current converter in FIG. 4B.

Figure 6:
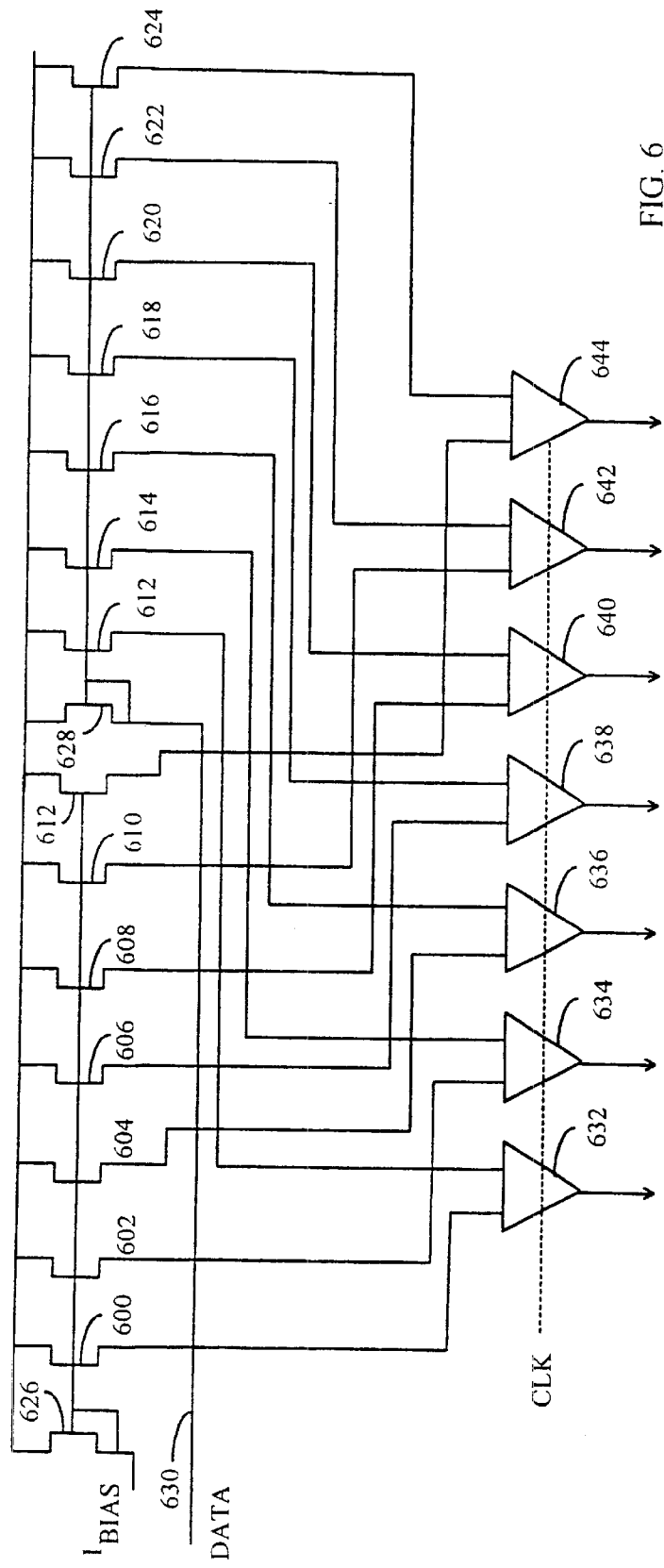
FIG. 6 shows a converter that converts the electric current into digital mode.

FIG. 6 shows a reverse current converter. Transistor units 600 to 610 correspond with the transistor units 504 to 516 shown on the bottom line in FIG. 5. Transistor units 612 to 624 correspond with the transistor units 520 to 532 shown on the top line in FIG. 5. A transistor unit 626 functioning as a diode corresponds with the transistor unit 500 in FIG. 5 and a transistor unit 628 also functioning as a diode corresponds with the transistor unit 502 in FIG. 5. The electric current strength of a bus 630 is compared with the bias current Ibias so that the voltages formed by the transistor unit pairs 600 & 612, 602 & 614, 604 & 616, 606 & 618, 608 & 622 and 612 & 624 are compared using comparators 632 to 644. The use of the comparators 632 to 644 improves the separation capacity of the current strengths. From the comparators 632 to 644 the voltage signals can be fed to a coder for converting the voltage values into binary mode.

Even though the invention has been described above with reference to the example of the accompanying drawings, it is obvious that the invention is not restricted thereto but can be modified in various ways within the scope of the inventive idea disclosed in the attached claims.

What is claimed is:

1. A data transmission method, in which the data to be transferred is digital comprising one or more bits, the value of each bit depending on the voltage, and which comprises forming an electric current corresponding with the digital value of the data to be transmitted and transferring the data as electric current on a bus and restoring the data on the transferred electric current after data transmission to digital data based on voltage strengths where the bit value depends on the voltage.

2. A method as claimed in claim 1, wherein forming an electric current corresponding with the binary value of the data to be transmitted for transferring the digital data.

3. A method as claimed in claim 1, wherein forming an electric current corresponding with the binary value of the data to be transmitted using current mirroring.

4. A method as claimed in claim 1, wherein converting each digital word into electric current for transferring the digital data when the data to be transferred comprises one or more digital words.

5. A method as claimed in claim 1, wherein dividing a digital word into two or more part-words when the data to be transferred comprises one or more digital words, and by forming an electric current corresponding with the digital value of each part-word in order to transfer each digital part-word.

6. A data transmission arrangement, in which the data to be transferred is digital comprising one or more bits, the value of each bit depending on the voltage, comprising at least one bus, at least one current converter for converting digital data into electric current, at least one reverse current converter for converting electric current into digital data, each current converter being connected to the reverse current converter by a bus for transferring data as electric current on the bus, and arranging a reverse current converter to restore the data on the transferred electric current as digital data based on voltage strengths where the bit value depends on the voltage.

7. A data transmission arrangement as claimed in claim 6, wherein arranging a current converter to form an electric current corresponding with the binary value of the data to be transmitted for transferring data.

8. A data transmission arrangement as claimed in claim 6, wherein arranging a current converter to form an electric current corresponding with the binary value of the data to be transmitted using current mirroring.

9. A data transmission arrangement as claimed in claim 6, wherein arranging a current converter to convert each digital word at a time into electric current when the data to be transferred comprises one or more digital words.

10. A data transmission arrangement as claimed in claim 6, wherein the arrangement being arranged to divide the digital word into two or more part-words when the data to be transferred comprises one or more digital words, and by the arrangement comprising a current converter, a bus and a reverse current converter for each digital part-word.

* * * * *